(12) United States Patent
Tachibana

(10) Patent No.: US 11,913,844 B2
(45) Date of Patent: Feb. 27, 2024

(54) DIAGNOSTIC DEVICE AND DIAGNOSTIC METHOD

(71) Applicant: YOKOGAWA ELECTRIC CORPORATION, Tokyo (JP)

(72) Inventor: Takuya Tachibana, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 417 days.

(21) Appl. No.: 17/202,497

(22) Filed: Mar. 16, 2021

(65) Prior Publication Data

US 2021/0302240 A1  Sep. 30, 2021

(30) Foreign Application Priority Data

Mar. 27, 2020 (JP) ................................. 2020-059140

(51) Int. Cl.
*G01K 7/026* (2021.01)

(52) U.S. Cl.
CPC ................................. *G01K 7/026* (2013.01)

(58) Field of Classification Search
CPC ....................................................... G01K 7/026
See application file for complete search history.

(56) References Cited

U.S. PATENT DOCUMENTS

| | | | | |
|---|---|---|---|---|
| 2,647,237 A | * | 7/1953 | Herbst | G01K 7/026 |
| | | | | 374/E7.007 |
| 3,468,164 A | * | 9/1969 | Sutherland | G01R 31/54 |
| | | | | 374/E7.007 |
| 3,973,184 A | * | 8/1976 | Raber | G01R 31/50 |
| | | | | 374/E7.007 |
| 2013/0250999 A1 | * | 9/2013 | Honeck | G01K 7/02 |
| | | | | 374/179 |

FOREIGN PATENT DOCUMENTS

| | | | | |
|---|---|---|---|---|
| CN | 102369422 A | * | 3/2012 | ............ G01K 7/026 |
| JP | S63100341 A | | 5/1988 | |
| JP | 4084568 B2 | | 4/2008 | |
| JP | 2013104791 A | | 5/2013 | |
| JP | 2015139274 A | | 7/2015 | |
| JP | 201867032 A | | 4/2018 | |
| JP | 6707214 B1 | * | 6/2020 | ............ G01K 7/021 |
| KR | 950008215 Y1 | * | 4/1995 | |
| WO | WO-9639617 A1 | * | 12/1996 | ............ G01K 15/00 |

* cited by examiner

*Primary Examiner* — Mirellys Jagan
(74) *Attorney, Agent, or Firm* — Osha Bergman Watanabe & Burton LLP

(57) ABSTRACT

A diagnostic device of a first thermocouple, the diagnostic device includes: a controller that acquires a first measurement value of the first thermocouple each time current passes through the first thermocouple and determines, in a first predetermined cycle and based on the acquired first measurement value, a presence of a disconnection risk that the first thermocouple will disconnect from the diagnostic device; and an output unit that outputs a first alarm indicating the disconnection risk based on a result of the determination by the controller.

9 Claims, 8 Drawing Sheets

DIAGNOSTIC DEVICE AND DIAGNOSTIC METHOD

BACKGROUND

Technical Field

The present disclosure relates to a system for monitoring the temperature of a plant, and more particularly relates to a diagnostic device and a diagnostic method relating to a thermocouple.

Related Art

There are cases where, for example, a paperless recorder is used to monitor the temperature of a material or the like in a plant. In such a case, a thermocouple is connected to the paperless recorder and the temperature of the material is measured and recorded. Thermocouples deteriorate over time due to corrosion or the like caused by the surrounding environment or chemical substances contained in the material, thereby leading to disconnection. Since monitoring of the temperature is no longer possible when the thermocouple disconnects, patent literature 1 proposes a method of sensing such a disconnection of a thermocouple.

PATENT LITERATURE

Patent Literature 1 Japanese Patent No. 4084568

Patent literature 1 describes art in which a disconnection is sensed by passing a current through a thermocouple and measuring voltage at both ends. However, conventionally, when it is sensed that a thermocouple has disconnected, this is dealt with by replacing the thermocouple, or the like. As such, it is no longer possible to monitor the temperature during the period from after disconnection until replacement or the like has been completed, leading to downtime occurring. That is, there is room for improvement in diagnostic art relating to thermocouple disconnection.

SUMMARY

One or more embodiments provide a diagnostic device and a diagnostic method capable of improving diagnostic art relating to thermocouple disconnection.

A diagnostic device relating to several embodiments is a diagnostic device relating to a thermocouple, wherein the diagnostic device includes:

a control unit (i.e., controller) for acquiring a measurement value relating to the thermocouple when a current is passed through the thermocouple, and determining in a predetermined cycle whether there is a sign that the thermocouple will disconnect ("disconnection risk") based on the measurement value; and an output unit for outputting a first alarm relating to the sign based on a determination result by the control unit.

In this manner, since the control unit determines whether there is a sign that the thermocouple will disconnect and outputs the first alarm relating to the sign, the diagnostic device relating to several embodiments is capable of outputting the first alarm at a stage when the sign is present before the thermocouple disconnects and encouraging replacement before the thermocouple disconnects. As such, the diagnostic device relating to several embodiments is capable of reducing downtime associated with thermocouple disconnection.

In one or more embodiments, the control unit may calculate an average value of the measurement value in a predetermined interval based on the measurement value and determine whether there is a sign that the thermocouple will disconnect based on the average value.

In this manner, since the control unit determines the sign based on the average value of the measurement value relating to the thermocouple, it is possible to prevent an erroneous determination associated with sudden fluctuations in the measurement value.

In one or more embodiments, the control unit may determine that the sign is present when the average value exceeds a first threshold and determine that the thermocouple is disconnected when the average value exceeds a second threshold; and the output unit may output a second alarm relating to the disconnection of the thermocouple when it is determined by the control unit that the thermocouple is disconnected.

In this manner, the control unit determines a sign of disconnection or disconnection by comparing the average value, the first threshold, and the second threshold. That is, the diagnostic device in one or more embodiments is capable of reporting the state of the thermocouple in more detail by using two thresholds for sign diagnosis and disconnection diagnosis. Furthermore, supposing that a disconnection has occurred, a user is thus capable of concluding whether there has been a disconnection due to a sudden factor without a previous sign. In other words, it is possible to easily isolate the cause when the thermocouple is disconnected.

In one or more embodiments, the output unit may output a third alarm indicating an abnormality when it is determined by the control unit that the difference between the measurement value and the average value exceeds a predetermined value.

In this manner, when the difference between the measurement value relating to the thermocouple and the average value thereof exceeds a predetermined value, the output unit is capable of outputting the third alarm to properly report to the user that some abnormality has occurred.

In one or more embodiments, the control unit makes the predetermined cycle shorter than before determining the sign is present when it is determined that the sign is present.

In this manner, after it has been determined that a sign is present, making the predetermined cycle relating to determining shorter makes it possible to determine a disconnection of the thermocouple in a timelier manner.

In one or more embodiments, the control unit may gradually make the predetermined cycle shorter when it is determined that the sign is present.

In this manner, after it has been determined that a sign is present, gradually making the predetermined cycle relating to determining shorter makes it possible to determine a disconnection of the thermocouple in a timelier manner.

In one or more embodiments, the control unit may acquire a second measurement value relating to a second thermocouple when the current is passed through the second thermocouple which is different to the thermocouple, calculate a second average value of the second measurement value in the predetermined interval based on the second measurement value, and determine the sign based on the average value and the second average value.

In this manner, determining a sign of disconnection by using the measurement value of the second thermocouple makes it possible to output the first alarm at a stage when the sign is present before the thermocouple disconnects and encourage replacement before the thermocouple disconnects.

In one or more embodiments, the second thermocouple may be a thermocouple for measuring the temperature of the same location as the thermocouple.

In this manner, making the second thermocouple measure the temperature of the same location as the thermocouple allows the temperature of the thermocouple to become substantially the same and makes it possible to eliminate the need for compensation of measurement values relating to temperature.

In one or more embodiments, the control unit may further determine that the sign is present when the average value exceeds a third threshold.

In this manner, the control unit is capable of appropriately determining the state of the thermocouple by comparing, in addition to the second threshold, the third threshold and the average value, even if the second thermocouple has deteriorated over time.

A diagnostic method relating to several embodiments is a diagnostic method relating to a thermocouple, the diagnostic method provided with:

a step for acquiring a measurement value relating to the thermocouple when a current is passed through the thermocouple, and determining in a predetermined cycle whether there is a sign that the thermocouple will disconnect based on the measurement value; and a step for outputting a first alarm relating to the sign based on a determination result by the measuring step.

In this manner, since the diagnostic method relating to several embodiments determines whether there is a sign that the thermocouple will disconnect and outputs the first alarm relating to the sign based on the determination result, it is possible to output the first alarm at a stage when the sign is present before the thermocouple disconnects and encourage replacement before the thermocouple disconnects. As such, the diagnostic method relating to several embodiments is capable of reducing downtime associated with thermocouple disconnection.

According to one or more embodiments of the present invention, it is possible to provide a diagnostic device and a diagnostic method capable of improving diagnostic art relating to thermocouple disconnection.

DETAILED DESCRIPTION

A diagnostic device 10 according to one or more embodiments is described with reference to drawings below. First, the configuration of the diagnostic device 10 according to one or more embodiments will be described with reference to FIG. 1.

Figure 1:
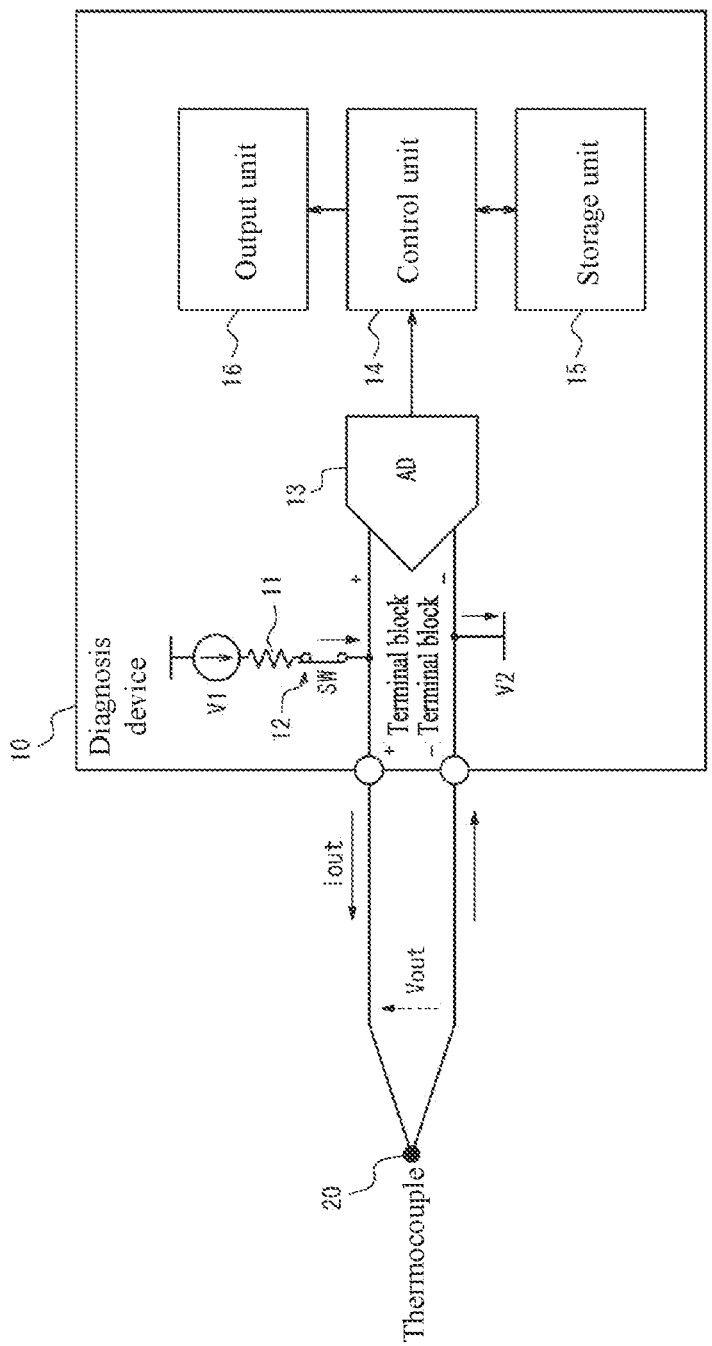
FIG. 1 is a functional block diagram of a diagnostic device according to one or more embodiments.

The diagnostic device 10 illustrated in FIG. 1 is connected to a thermocouple 20 for monitoring the temperature of a material or the like in a plant. The diagnostic device 10 includes a current source 11, a switch 12, an AD converter 13, a control unit 14, a storage unit 15, and an output unit 16. FIG. 1 illustrates, as a summary, to realize a diagnostic method according to one or more embodiments using a device functioning as a temperature measurement device (paperless recorder).

The current source 11 is a circuit connected to the thermocouple 20 via the switch 12 and a terminal block. When determining the state of the thermocouple 20 using the diagnostic method in one or more embodiments, the current source 11 passes a current for diagnosis through the thermocouple 20. In this case specifically, the switch 12 is turned ON by control of the control unit 14 and the current source 11 passes the current for diagnosis through the thermocouple 20. Meanwhile, when the thermocouple 20 is monitoring the temperature of a material or the like in a plant, the switch 12 is turned OFF by control of the control unit 14. In this case, the current source 11 does not pass the current for diagnosis through the thermocouple 20.

The AD converter 13 acquires analogue data on the voltage at both ends of the thermocouple 20, converts it to digital data, and transfers it to the control unit 14. When the switch 12 is OFF, the AD converter 13 converts the analogue data on the voltage at both ends of the thermocouple 20 to digital data and transfers it to the control unit. The control unit 14 implements a predetermined processing based on the digital data and the temperature measured by the thermocouple 20 is output by the output unit 16. For example, the control unit 14 displays temperature trends measured by the thermocouple 20 using the output unit 16 in a predetermined cycle. Meanwhile, when the switch 12 is ON, the AD converter 13 converts the analogue data on the voltage at both ends in a state where current from the current source 11 is passed through the thermocouple 20 to digital data and transfers it to the control unit 14.

The control unit 14 includes at least one processor, at least one dedicated circuit, or a combination of these. The processor is a general purpose processor such as an MCU (microcontroller unit) or CPU (central processing unit), or a dedicated processor specialized for specific processing. The dedicated circuit is, for example, a FPGA (field-programmable gate array) or ASIC (application-specific integrated circuit). The control unit 14 executes processing related to the diagnostic device 10 while controlling each part of the diagnostic device 10.

The storage unit 15 includes at least one semiconductor memory, at least one magnetic memory, at least one optical memory, or a combination of at least two types among these. The semiconductor memory is, for example, a RAM (random-access memory) or a ROM (read-only memory). The RAM is, for example, an SRAM (static random-access memory) or a DRAM (dynamic random-access memory). The ROM is, for example, an EEPROM (electrically erasable programmable read-only memory). The storage unit 15 functions as, for example, a main storage device, an auxiliary storage device, or a cache memory. The storage unit 15 stores data used in the operations of the diagnostic device 10 and data obtained by the operations of the diagnostic device 10.

The output unit 16 includes at least one output interface. The output interface is, for example, a display or a speaker.

The display is, for example, an LCD (liquid crystal display) or an organic EL (electro luminescence) display. The output unit 16 outputs data obtained by the operations of the diagnostic device 10. Furthermore, the output unit 16 may include at least one communication interface. The communication interface is, for example, an interface compatible with a mobile communication standard such as a LAN interface, WAN interface, LTE (Long-Term Evolution), 4G (fourth generation), or 5G (fifth generation) or an interface compatible with near-field communication such as Bluetooth (registered trademark). The output unit 16 may output data obtained by the operations of the diagnostic device 10 to external equipment using the communication interface.

Figure 2:
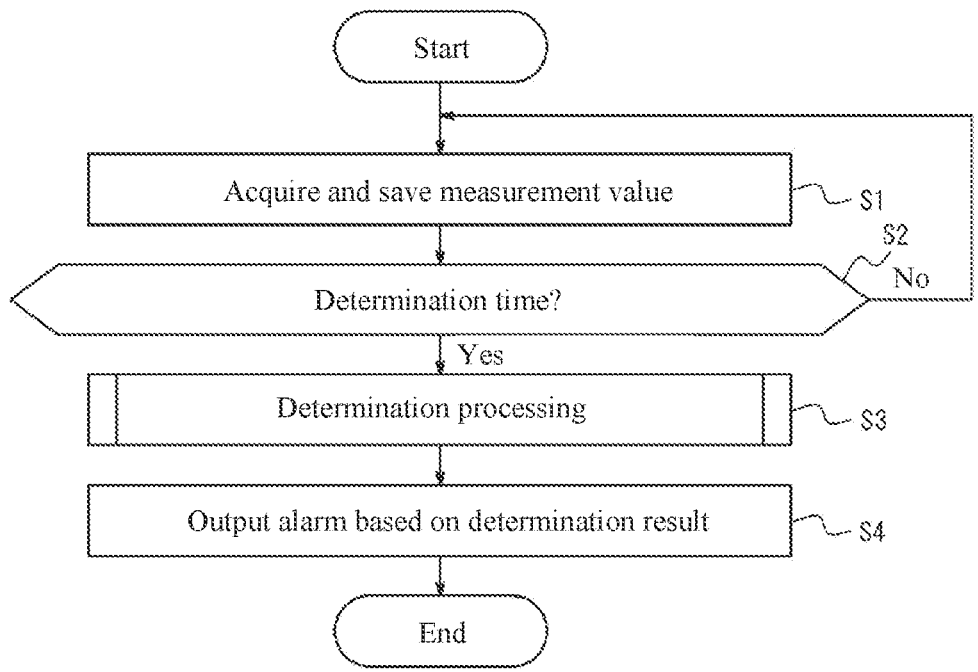
FIG. 2 is a flowchart illustrating a diagnostic method according to one or more embodiments.

Next, the diagnostic method executed by the diagnostic device 10 according to one or more embodiments will be described based on FIG. 2 to FIG. 5. FIG. 2 is a flowchart illustrating a diagnostic method relating to one or more embodiments.

First, the control unit 14 acquires a measurement value relating to the thermocouple 20 and saves it in the storage unit 15 (step S1). Specifically, the control unit 14 turns the switch 12 ON and passes a current from the current source 11 through the thermocouple 20. The AD converter 13 converts analogue data on the voltage at both ends of the thermocouple 20 at this time to digital data and transfers it to the control unit 14. The control unit 14 acquires such digital data and saves it in the storage unit 15. Here, the measurement value relating to the thermocouple 20 is the voltage value at both ends of the thermocouple 20; however, the measurement value relating to the thermocouple 20 may be a resistance value of the thermocouple 20 converted from the voltage value at both ends of the thermocouple 20. Such a resistance value may be found from the following relational expression.

$$Vr(t) = R_{line}(t) \times i_{out}$$

Here, Vr (t) is the measurement value at both ends of the thermocouple 20, $R_{line}$ (t) is the resistance value of the thermocouple 20, and $i_{out}$ is the current value supplied from the current source 11. Since $i_{out}$ is well-known and Vr (t) is obtained from the digital data by the AD converter 13, the control unit 14 may also obtain the resistance value based on these.

Next, the control unit 14 determines whether the current time is the time at which determination of the thermocouple 20 is performed (hereinafter also referred to as determination time) (step S2). Specifically, the control unit 14 refers to information of a predetermined cycle stored in the storage unit 15. Information of such a predetermined cycle establishes whether the control unit 14 performs the determination processing at a certain timing, and, for example, is a daily cycle, a 12 hour cycle, or the like. In the case where it is the determination time, the process proceeds to step S3. Meanwhile, in the case where it is not the determination time, the process returns to step S1.

In the case where it is the determination time in step S2, the control unit 14 determines whether there is a sign that the thermocouple 20 will disconnect based on the measurement value relating to the thermocouple 20 (step S3).

Figure 3:
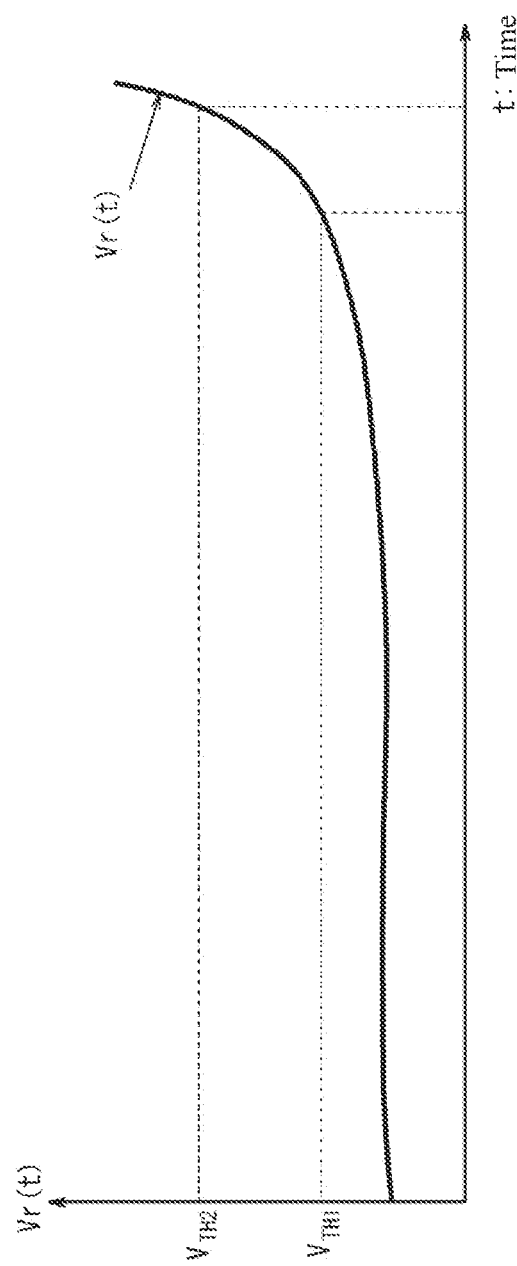
FIG. 3 is a diagram illustrating a summary of a simple determination according to one or more embodiments.

The determination processing in step S3 gains various conditions. For example, the control unit 14 may determine the sign of disconnection according to the measurement value relating to the thermocouple 20. The determination processing is also referred to as simple determination below. FIG. 3 is a diagram illustrating a summary of determination processing according to simple determination relating to one or more embodiments. As illustrated in FIG. 3, when deterioration of the thermocouple 20 proceeds with the passage of time, the voltage Vr (t) at both ends of the thermocouple 20 increases. The control unit 14 compares the measurement value relating to the thermocouple 20 and a predetermined threshold to determine the sign of disconnection. Here, the control unit 14 compares the measurement value relating to the thermocouple 20 (in other words, here it is the voltage Vr (t) at both ends) and a first threshold ($V_{TH1}$) to determine the sign of disconnection. Specifically, when the voltage Vr (t) at both ends of the thermocouple 20 exceeds the first threshold, the control unit 14 determines that the sign of disconnection is present. Meanwhile, when the voltage Vr (t) at both ends of the thermocouple 20 is the first threshold or less, the control unit 14 determines that the sign of disconnection is not present. Moreover, the control unit 14 compares the voltage Vr (t) at both ends of the thermocouple 20 and a second threshold ($V_{TH2}$) to determine disconnection. Specifically, when the voltage Vr (t) at both ends of the thermocouple 20 exceeds the second threshold, the control unit 14 determines that there is a disconnection. Meanwhile, when the voltage Vr (t) at both ends of the thermocouple 20 is the second threshold or less, the control unit 14 determines that there is no disconnection. Here, in one or more embodiments, a state where "the thermocouple 20 is disconnected" also includes, in addition to a state where the thermocouple 20 is disconnected, a state immediately before the thermocouple 20 disconnects. The state immediately before the thermocouple 20 disconnects is a state where, for example, there is a possibility that the thermocouple 20 will disconnect within a predetermined time.

FIG. 2 will be referenced again. The control unit 14 causes the output unit 16 to output an alarm based on a determination result (step S4). For example, when it is determined that the sign of disconnection is present, the control unit 14 causes the output unit 16 to output an alarm (hereinafter also referred to as a first alarm) to indicate that the sign of disconnection of the thermocouple 20 is present. For example, the output unit 16 may display and output the first alarm on a screen or the like. Furthermore, the output unit 16 may send the first alarm to a terminal or the like of a user using email or the like. Furthermore, for example, when it is determined that the thermocouple 20 is disconnected, the control unit 14 causes the output unit 16 to output an alarm (hereinafter also referred to as a second alarm) to indicate disconnection. For example, the output unit 16 may display and output the second alarm on a screen or the like. Furthermore, the output unit 16 may send the second alarm to a terminal or the like of a user using email or the like.

Figure 4:
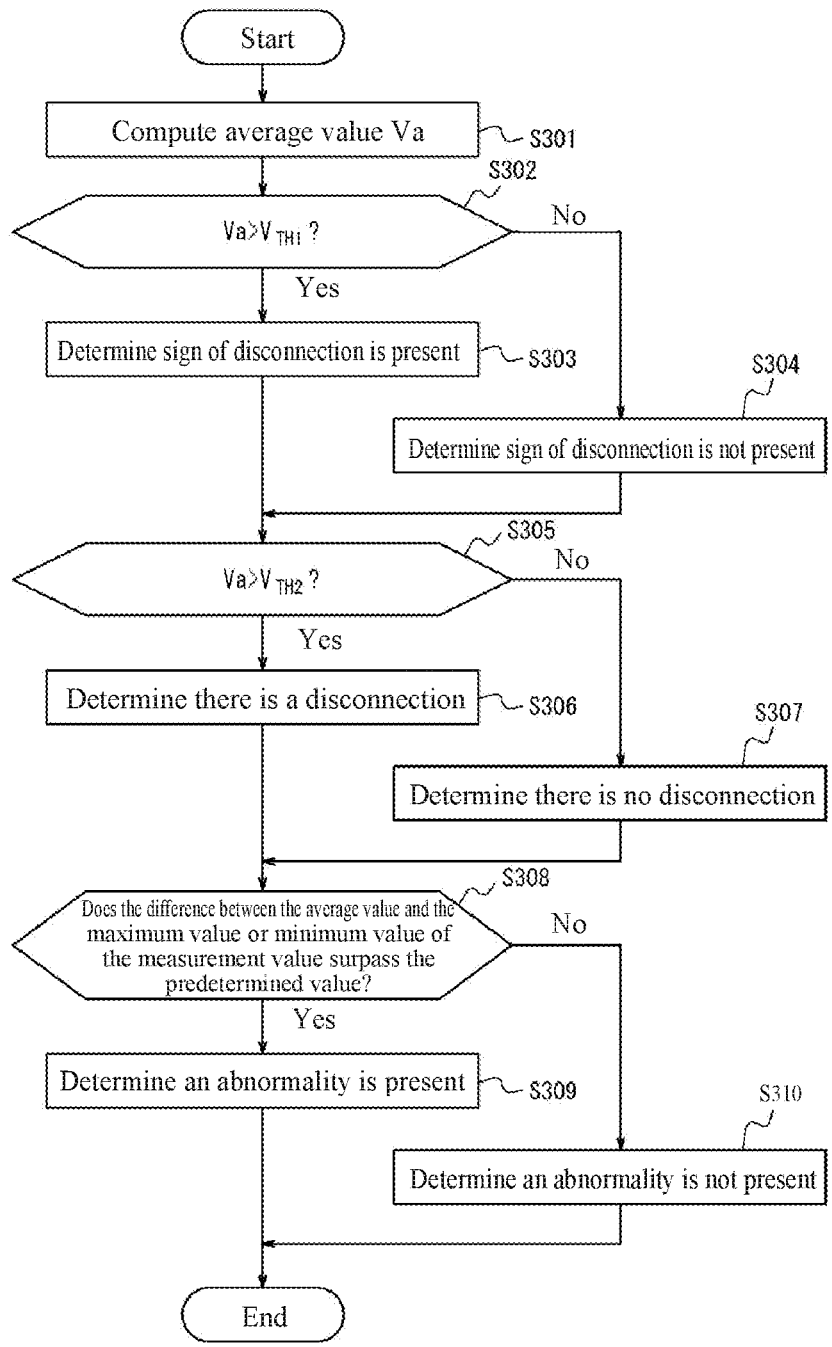
FIG. 4 is a flowchart illustrating determination processing according to interval determination.
Figure 5:
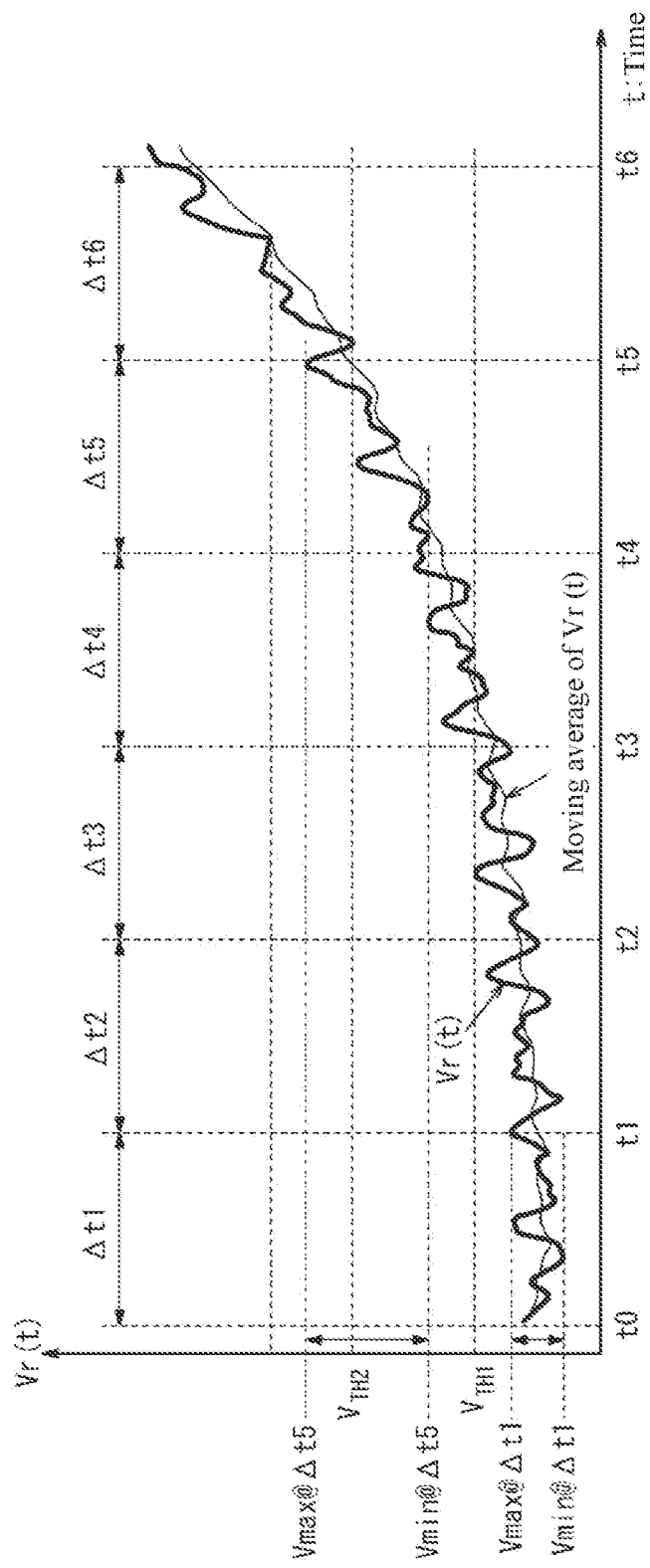
FIG. 5 is a diagram illustrating a summary of interval determination according to one or more embodiments.

The control unit 14 may perform the determination processing in step S3 based on an average value of the measurement value in a predetermined interval. The determination processing is referred to as interval determination in one or more embodiments below. FIG. 4 is a flowchart illustrating determination processing according to interval determination. First, the control unit 14 calculates the average value Va in a predetermined interval of the measurement value relating to the thermocouple 20 (step S301). A summary of the interval determination is illustrated in FIG. 5. In FIG. 5, a moving average of the measurement value has been calculated as the average value Va in a predetermined interval. The control unit 14 performs determination processing based on the moving average value at each time t1, t2, t3, t4, and t5 in FIG. 5.

FIG. 4 will be referenced again. The control unit 14 determines whether the average value Va calculated in step S301 exceeds the first threshold ($V_{TH1}$) (step S302). If the average value Va exceeds the first threshold, the control unit 14 determines that the sign of disconnection of the thermocouple 20 is present (step S303). Meanwhile, if the average value Va does not exceed the first threshold, the control unit 14 determines that the sign of disconnection of the thermocouple 20 is not present (step S304). Specifically, for example, the control unit 14 calculates the moving average value Va of the measurement value at the time t1 in FIG. 5. Also, the control unit 14 compares the moving average value Va and the first threshold to determine the sign of disconnection. Since the average value is the first threshold or less at this interval, the control unit 14 determines that the sign of disconnection of the thermocouple 20 is not present. Furthermore, for example, the control unit 14 calculates the moving average value Va of the measurement value at the time t4 in FIG. 5. Also, the control unit 14 compares the moving average value Va and the first threshold to determine the sign of disconnection. In this case, since the moving average value Va exceeds the first threshold, the control unit 14 determines that the sign of disconnection of the thermocouple 20 is present.

FIG. 4 will be referenced again. The control unit 14 determines whether the average value Va calculated in step S301 exceeds the second threshold ($V_{TH2}$) (step S305). If the average value Va exceeds the second threshold, the control unit 14 determines that the thermocouple 20 is disconnected (step S306). Meanwhile, if the average value Va does not exceed the second threshold, the control unit 14 determines it is not disconnected (step S307). For example, the control unit 14 calculates the moving average value Va of the measurement value at t6 in FIG. 5. Also, the control unit 14 compares the moving average value Va and the first threshold to determine disconnection. In this case, since the moving average value Va exceeds the second threshold, the control unit 14 determines that the thermocouple 20 is disconnected.

FIG. 4 will be referenced again. The control unit 14 determines whether the difference between the average value Va calculated in step S301 and the maximum value or minimum value of the measurement value in each predetermined interval exceeds a predetermined value (step S308). For example, t0 to t1, t1 to t2, t2 to t3, t3 to t4, t4 to t5, and t5 to t6 are established as predetermined intervals in FIG. 4. If the difference between the average value Va and the maximum value and minimum value of the measurement value in each interval exceeds a predetermined value, the control unit 14 determines that an abnormality is present (step S309). Meanwhile, if the difference between the average value Va the maximum value and minimum value of the measurement value in each interval is a predetermined value or less, the control unit 14 determines that an abnormality is not present (step S310). For example, Vmax@Δt1 and Vmin@Δt1 in FIG. 4 are the maximum value and minimum value, respectively, of the measurement value at t0 to t1. The control unit 14 compares these values and the average value Va to perform the determination. Similarly, Vmax@Δt5 and Vmin@Δt5 are the maximum value and minimum value, respectively, of the measurement value at t4 to t5. The control unit 14 compares these values and the average value Va to perform the determination.

FIG. 2 will be referenced again. The control unit 14 causes the output unit 16 to output an alarm based on the determination result (step S4). For example, when it is determined that the sign of disconnection is present, the control unit 14 causes the output unit 16 to output the first alarm. For example, the output unit 16 may display and output the first alarm on a screen or the like. Furthermore, the output unit 16 may send the first alarm to a terminal or the like of a user using email or the like. Furthermore, for example, when it is determined that the thermocouple 20 is disconnected, the control unit 14 causes the output unit 16 to output the second alarm. For example, the output unit 16 may display and output the second alarm on a screen or the like. Furthermore, the output unit 16 may send the second alarm to a terminal or the like of a user using email or the like. Furthermore, for example, when it is determined that an abnormality is present in the thermocouple 20, the control unit 14 causes the output unit 16 to output an alarm to indicate that an abnormality is present in the thermocouple 20 (hereinafter also referred to as a third alarm). For example, the output unit 16 may display and output the third alarm on a screen or the like. Furthermore, the output unit 16 may send the third alarm to a terminal or the like of a user using email or the like.

In this manner, according to the diagnostic device 10 of one or more embodiments, since the control unit 14 determines whether there is a sign that the thermocouple will disconnect and the output unit 16 outputs the first alarm, it is possible to output the first alarm at a stage when the sign is present before the thermocouple disconnects and encourage replacement before the thermocouple disconnects. As such, the diagnostic device 10 of one or more embodiments is capable of reducing downtime associated with thermocouple disconnection.

Furthermore, according to interval determination by the diagnostic device 10 of one or more embodiments, since the control unit 14 determines the sign based on the average value of the measurement value relating to the thermocouple 20, it is possible to prevent an erroneous determination associated with a sudden fluctuation in the measurement value.

Furthermore, according to the diagnostic device 10 of one or more embodiments, the control unit 14 determines that the sign of disconnection of the thermocouple 20 is present when the average value exceeds the first threshold, and determines that the thermocouple 20 is disconnected when the average value exceeds the second threshold. Also, when it is determined by the control unit 14 that the thermocouple 20 is disconnected, the output unit 16 outputs the second alarm. As such, the diagnostic device 10 of one or more embodiments is capable of more accurately reporting the state of the thermocouple 20 by using two thresholds for sign diagnosis and disconnection diagnosis. Furthermore, supposing that a disconnection has occurred, a user is thus capable of concluding whether the disconnection occurred due to a sudden trigger without a previous sign. In other words, according to the diagnostic device 10 of one or more embodiments, it is possible to easily isolate the cause when the thermocouple 20 is disconnected.

Furthermore, according to the diagnostic device 10 of one or more embodiments, when the difference between the measurement value and the average value exceeds a predetermined value, the control unit 14 causes the output unit 16 to output the third alarm. In this manner, according to the diagnostic device 10 of one or more embodiments, when the difference between the measurement value relating to the thermocouple 20 and the average value thereof is the predetermined value or more, the third alarm is output so that the user may properly grasp that some abnormality has occurred.

Embodiments of the present invention are described based on various drawings. However, a person skilled in the art can easily make many different variations and modifications based on one or more embodiments. Therefore, these variations and modifications are included in the scope of the present disclosure. For example, the functions or the like included in each configuration, each step, or the like can be rearranged so as to not logically contradict, and a plurality of configurations, steps, or the like can be combined into one or be divided.

For example, when it is determined that the sign of disconnection of the thermocouple 20 is present, the control unit 14 may make the predetermined cycle relating to determination shorter than before determining the sign is present. For example, when the predetermined cycle is one day before it is determined that the sign is present, the predetermined cycle after it has been determined that the sign is present may be set to 12 hours or the like. In this manner, making the predetermined cycle shorter after it has been determined that a sign is present makes it possible to determine a disconnection of the thermocouple in a timelier manner.

Furthermore, for example, when it is determined that the sign is present, the control unit 14 may gradually make the predetermined cycle relating to determination shorter. For example, the control unit 14 may set the predetermined cycle to ½ its length for each determination processing. In this manner, gradually making an acquisition cycle of the measurement value shorter after it has been determined that a sign is present makes it possible to determine a disconnection of the thermocouple in a timelier manner. In this case, a lower limit value of the predetermined cycle may be provided. For example, when the lower limit is set to 10 minutes, the predetermined cycle must not be less than 10 minutes.

Figure 6:
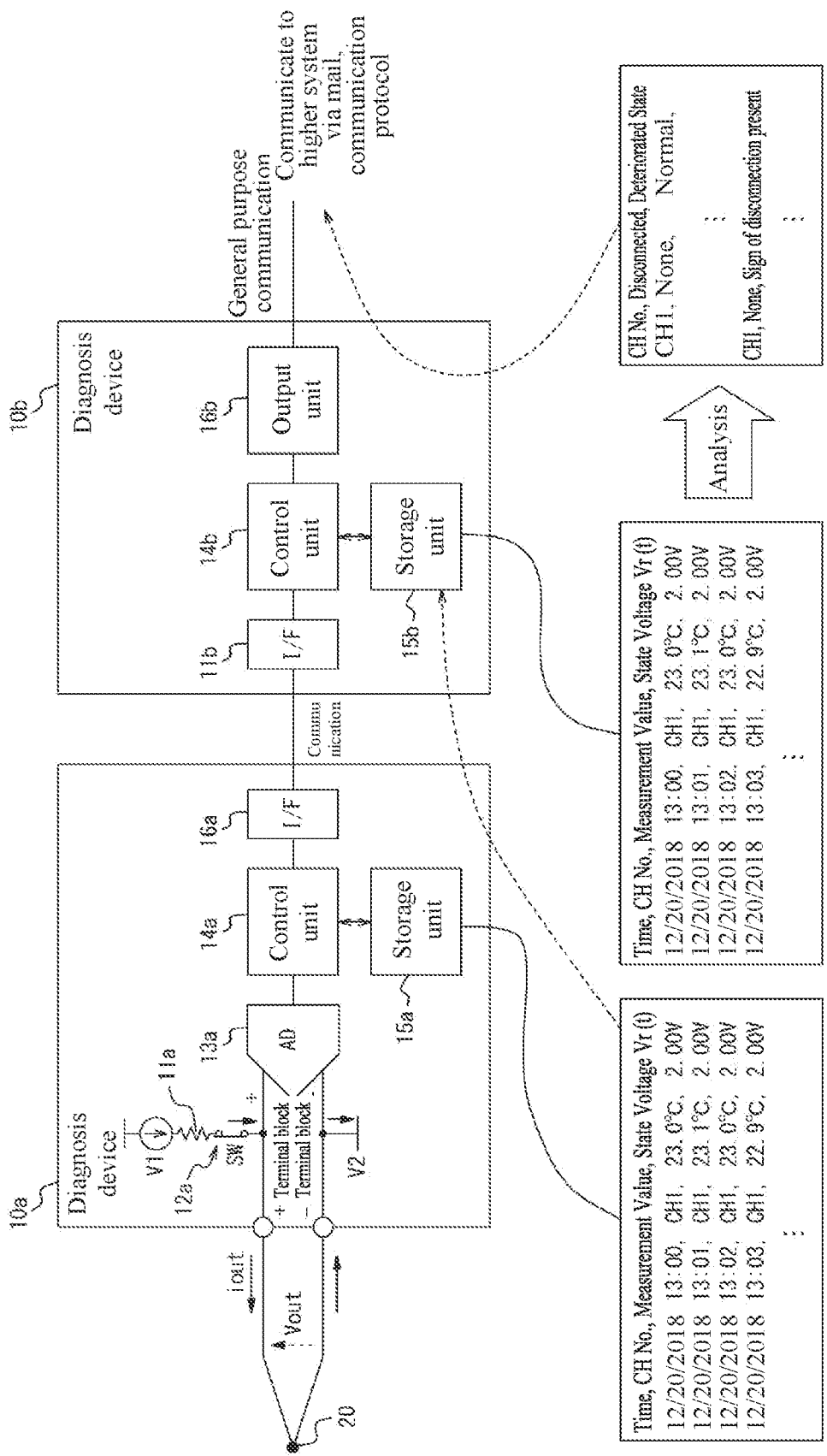
FIG. 6 is another functional block diagram of a diagnostic device according to one or more embodiments.

Furthermore, in one or more embodiments, the temperature measurement device (paperless recorder) is a device that functions as the diagnostic device 10 and the measurement value from the thermocouple 20 is acquired by the AD converter 13, but the present disclosure is not limited thereto. For example, the diagnostic device 10 may be a device different to a device that functions as a temperature measurement device. FIG. 6 is another functional block diagram of a diagnostic device relating to one or more embodiments. In FIG. 6, a diagnostic device 10b is provided separately to a measurement device 10a. The measurement device 10a includes a current source 11a, a switch 12a, an AD converter 13a, a control unit 14a, a storage unit 15a, and an interface (IF) 16a. The current source 11a, the switch 12a, the AD converter 13a, the control unit 14a, and the storage unit 15a are provided with the same functions as the current source 11, the switch 12, the AD converter 13, the control unit 14, and the storage unit 15 in FIG. 1, respectively. The IF 16a is a communication interface, and is, for example, an interface compatible with a mobile communication standard such as a LAN interface, WAN interface, LTE (Long-Term Evolution), 4G (fourth generation), or 5G (fifth generation) or an interface compatible with near-field communication such as Bluetooth (registered trademark). The IF 16a outputs data obtained by the operations of the measurement device 10a to the diagnostic device 10b. Specifically, the IF 16a sends and outputs the measurement value relating to the thermocouple 20 to the diagnostic device 10b.

The diagnostic device 10b includes an IF 11b, a control unit 14b, a storage unit 15b, and an output unit 16b. The control unit 14b, the storage unit 15b, and the output unit 16b are provided with the same functions as the control unit 14, the storage unit 15, and the output unit 16 in FIG. 1, respectively. The IF 11b is a communication interface, and is, for example, an interface compatible with a mobile communication standard such as a LAN interface, WAN interface, LTE (Long-Term Evolution), 4G (fourth generation), or 5G (fifth generation) or an interface compatible with near-field communication such as Bluetooth (registered trademark). The IF 11b receives data obtained by the operations of the measurement device 10a from the measurement device 10a. Specifically, the IF 11b receives the measurement value relating to the thermocouple 20 from the measurement device 10a. That is, the diagnostic device 10b illustrated in FIG. 6 acquires (receives) the measurement value relating to the thermocouple 20 from an external part and determines the sign of disconnection relating to the thermocouple 20 based on the measurement value. Furthermore, the diagnostic device 10b as illustrated in FIG. 6 uses the output unit 16b to report the determined results to a higher system using email or a predetermined communication protocol. In this manner, the diagnostic method of one or more embodiments may be performed by a device separate from the temperature measurement device. Moreover, in this case the diagnostic device 10b may perform machine learning using the measurement value relating to the thermocouple 20 and corresponding actual data as teacher data to generate a learning model relating to the determination processing. Also, the diagnostic device 10b may determine the sign of disconnection of the thermocouple 20 based on the learning model.

Figure 7:
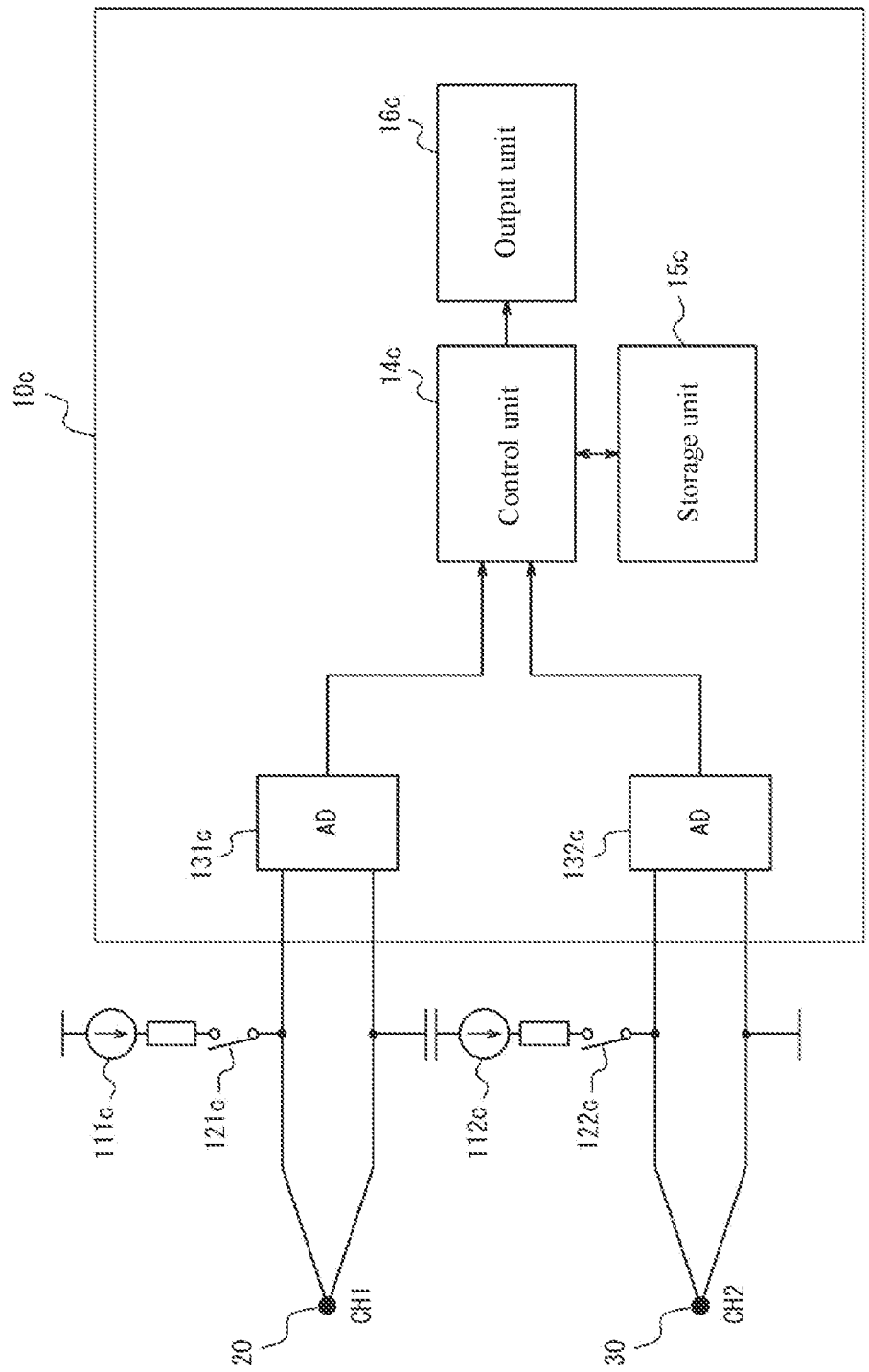
FIG. 7 is yet another functional block diagram of a diagnostic device according to one or more embodiments.

Furthermore, for example, the control unit 14 may use another thermocouple 30 (hereinafter also referred to as second thermocouple 30) that is different to the thermocouple 20. Specifically, the control unit 14 acquires a second measurement value relating to the second thermocouple 30 when a current is passed through the second thermocouple 30. Furthermore, the control unit 14 calculates a second average value of the second measurement value in a predetermined interval based on the second measurement value. Also, the control unit 14 may determine the sign of disconnection of the thermocouple 20 based on the average value of the measurement value relating to the thermocouple 20 (hereinafter also referred to as first average value) and the second average value. Here, FIG. 7 is a functional block diagram of the diagnostic device 10c relating to one or more embodiments. As illustrated in FIG. 7, the diagnostic device 10c is connected to the thermocouple 20 and the second thermocouple 30, and includes a current source 111c, a current source 112c, a switch 121c, a switch 122c, an AD converter 131c, an AD converter 132c, a control unit 14c, a storage unit 15c, and an output unit 16c. The current source 111c, the switch 121c, the AD converter 131c, the control unit 14c, the storage unit 15c, and the output unit 16c are equivalent to the current source 11, the switch 12, the AD converter 13, the control unit 14, the storage unit 15, and the output unit 16 in FIG. 1, respectively. The current source 112c is a circuit connected to the second thermocouple 30 via the switch 122c and a terminal block. When determining the state of the thermocouple 20 using the diagnostic method in one or more embodiment of the present invention, the current source 112 passes a current for diagnosis through the second thermocouple 30. In this case specifically, the switch 122c is turned ON by control of the control unit 14c and the current source 112c passes the current for diagnosis through the second thermocouple 30. Meanwhile, when the second thermocouple 30 is monitoring the temperature of a material or the like in a plant, the switch 122c is turned OFF by control of the control unit 14c. In this case, the current source 112c does not pass the current for diagnosis through the second thermocouple 30. The AD converter 132c acquires analogue data on the voltage at both ends of the second thermocouple 30, converts it to digital data, and transfers it to the control unit 14c. When the switch 122c is OFF, the AD converter 132c converts the analogue data on the voltage at both ends of the second thermocouple 30 to digital data and transfers it to the control unit 14c. The control unit 14c implements a predetermined processing based on the digital data and the temperature measured by the second thermocouple 30 is output by the output unit 16c. For example, the control unit 14c displays temperature trends measured by the second thermocouple 30 using the output unit 16c in a predetermined cycle. Meanwhile, when the switch 122c is ON, the AD converter 132c converts the analogue data on the voltage at both ends in a state where a current is passed through the second thermocouple 30 to digital data and transfers it to the control unit 14c.

Figure 8:
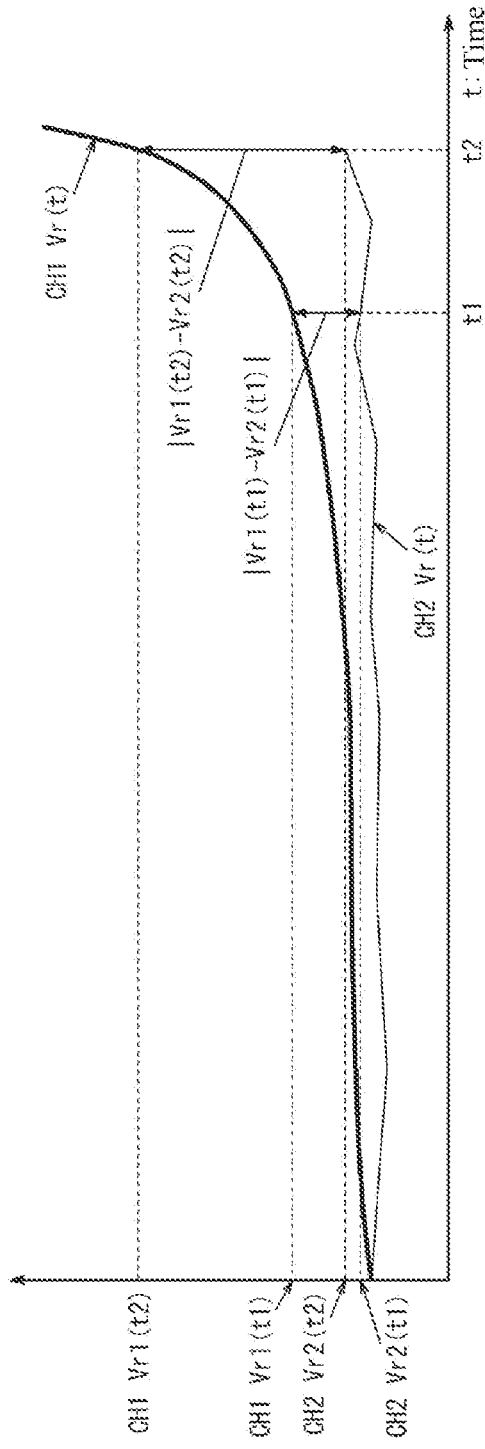
FIG. 8 is a diagram illustrating a summary of a plurality of analysis determinations according to one or more embodiments.

The control unit 14c determines the sign of disconnection of the thermocouple 20 based on the average value of the measurement value relating to the thermocouple 20 and the average value relating to the second thermocouple 30—that is, the first average value and the second average value. The control unit 14 may also determine the sign of disconnection of the second thermocouple 30 based on the first average value and the average value. The determination is also hereinafter referred to as a plurality of analysis determinations in one or more embodiments. FIG. 8 is a diagram illustrating a summary of the plurality of analysis determinations of one or more embodiments. A channel 1 (CH1) and a channel 2 (CH2) in FIG. 8 are the moving average values of the measurement values relating to the thermocouple 20 and the second thermocouple 30, respectively. When the difference between the first average value and the second average value surpasses a predetermined value, the control unit 14 may determine that the sign of disconnection is present for either the thermocouple 20 or the second thermocouple 30. For example, when the first average value is greater than the second average value and also the difference between these exceeds a predetermined value, the control unit 14c may determine that the sign of disconnection is present for the thermocouple 20. Furthermore, for example, when the first average value is less than the second average value and also the difference between these exceeds a predetermined value, the control unit 14c may determine that the sign of disconnection is present for the second thermocouple 30. By providing a plurality of predetermined values serving as standards, the control unit 14c may determine the sign of disconnection and disconnect respectively.

Here, the positions where the thermocouple 20 and the second thermocouple 30 are provided may be at any location. When the thermocouple 20 and the second thermocouple 30 are provided at different locations, there may be cases where the temperatures measured by the thermocouple 20 and the second thermocouple 30 differ due to the positions where they are provided. The control unit 14c may compensate for discrepancies between the measurement values due to variations in the measured temperatures. By doing so, it is possible to perform a plurality of analysis determinations, even if the thermocouple 20 and the second thermocouple 30 are provided at different positions. Meanwhile, the thermocouple 20 and the second thermocouple 30 may be thermocouples that measure the temperature of the same location. In this case, since the same temperature is being measured, there is no need for the foregoing compensation. Furthermore, in this case, when the average value of the measurement value relating to the thermocouple 20 exceeds the third threshold, the control unit 14c may further determine that the sign of disconnection is present. In this manner, the control unit 14c is capable of appropriately determining the state of the thermocouple by comparing the third threshold and the first average value in addition to the difference between the first average value and the second average value, even if the threshold 20 and the second thermocouple 30 have similarly deteriorated over time.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

10, 10b, 10c diagnostic device
10a measurement device
11, 11a, 111c, 112c current source
11b IF
12, 12a, 121c, 122c switch
13, 13a, 131c, 132c switch
14, 14a, 14b, 14c control unit
15, 15a, 15b, 15c storage unit
16, 16b, 16c output unit
16aIF
20 thermocouple
30 second thermocouple

What is claimed is:

1. A diagnostic device of a first thermocouple, the diagnostic device comprising:
    a controller that:
        acquires a first measurement value of the first thermocouple each time a current passes through the first thermocouple, and
        determines, in a first predetermined cycle and based on the acquired first measurement value, a presence of a disconnection risk that the first thermocouple will disconnect from the diagnostic device; and
    an output unit that outputs a first alarm indicating the disconnection risk based on a result of the determination by the controller, wherein
    the controller:
        calculates a first average value of a plurality of acquired first measurement values in a predetermined interval, and
        determines, based on the first average value, whether the disconnection risk is present.

2. The diagnostic device according to claim 1, wherein the controller determines that:
    the disconnection risk is present when the first average value exceeds a first threshold, and
    the first thermocouple is disconnected when the first average value exceeds a second threshold, and
    the output unit outputs a second alarm indicating disconnection of the first thermocouple when the controller has determined that the first thermocouple is disconnected.

3. The diagnostic device according to claim 1, wherein the output unit outputs an alarm indicating an abnormality when the controller has determined that a difference between any of the first measurement values and the first average value exceeds a predetermined value.

4. The diagnostic device according to claim 1, wherein the controller further:
    acquires a second measurement value of a second thermocouple each time a current passes through the second thermocouple,
    calculates a second average value of a plurality of acquired second measurement values in the predetermined interval, and determines the disconnection risk based on the first average value and the second average value.

5. The diagnostic device according to claim 4, wherein the second thermocouple measures a temperature of the same location as the first thermocouple.

6. The diagnostic device according to claim 5, wherein the controller further determines that the disconnection risk is present when the first average value exceeds a threshold.

7. A diagnostic device of a thermocouple, the diagnostic device comprising:
a controller that:
acquires a measurement value of the thermocouple each time a current passes through the thermocouple, and
determines, in a first predetermined cycle and based on the acquired measurement value, a presence of a disconnection risk that the thermocouple will disconnect from the diagnostic device; and
an output unit that outputs an alarm indicating the disconnection risk based on a result of the determination by the controller, wherein
when the controller has determined that the disconnection risk is present, the controller determines a second predetermined cycle shorter than the first predetermined cycle.

8. A diagnostic device of a thermocouple, the diagnostic device comprising:
a controller that:
acquires a measurement value of the thermocouple each time a current passes through the thermocouple, and
determines, in a predetermined cycle and based on the acquired measurement value, a presence of a disconnection risk that the thermocouple will disconnect from the diagnostic device; and
an output unit that outputs an alarm indicating the disconnection risk based on a result of the determination by the controller, wherein
the controller gradually shortens the predetermined cycle when the controller has determined that the disconnection risk is present.

9. A diagnostic method of a thermocouple, the diagnostic method comprising:
acquiring a measurement value of the thermocouple each time a current passes through the thermocouple;
determining, in a predetermined cycle and based on the acquired measurement value, a presence of a disconnection risk that the thermocouple will disconnect from a diagnostic device;
outputting an alarm indicating the disconnection risk based on a result of the determination;
calculating an average value of a plurality of acquired measurement values in a predetermined interval; and
determining, based on the average value, whether the disconnection risk is present.

* * * * *